(12) United States Patent
Namba

(10) Patent No.: US 11,904,936 B2
(45) Date of Patent: Feb. 20, 2024

(54) DRIVING SUPPORT DEVICE FOR VEHICLE

(71) Applicant: SUBARU CORPORATION, Tokyo (JP)

(72) Inventor: Ryosuke Namba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 83 days.

(21) Appl. No.: 17/212,816

(22) Filed: Mar. 25, 2021

(65) Prior Publication Data

US 2021/0323606 A1 Oct. 21, 2021

(30) Foreign Application Priority Data

Apr. 17, 2020 (JP) ................................. 2020-074085

(51) Int. Cl.
*B62D 15/02* (2006.01)
*B62D 6/00* (2006.01)

(52) U.S. Cl.
CPC .......... *B62D 15/025* (2013.01); *B62D 6/002* (2013.01)

(58) Field of Classification Search
CPC .............................. B62D 15/025; B62D 6/002
USPC ....................................................... 701/41, 1
See application file for complete search history.

(56) References Cited

U.S. PATENT DOCUMENTS

| | | | | |
|---|---|---|---|---|
| 2015/0012179 A1* | 1/2015 | Matsuno | .................. | B62D 1/28 |
| | | | | 701/41 |
| 2015/0354968 A1* | 12/2015 | Mizuno | .................. | G01C 21/32 |
| | | | | 701/534 |
| 2019/0225219 A1 | 6/2019 | Ueda et al. | | |
| 2020/0310439 A1* | 10/2020 | Kato | .................. | G01C 21/3492 |
| 2020/0317196 A1* | 10/2020 | Yoshida | .............. | B60W 30/181 |
| 2021/0148711 A1* | 5/2021 | Sun | ........................ | B60W 40/06 |
| 2021/0253166 A1* | 8/2021 | Tomoi | .................. | B62D 15/025 |

FOREIGN PATENT DOCUMENTS

| | | | |
|---|---|---|---|
| JP | 2019-128612 A | 8/2019 | |
| JP | 2019131077 A * | 8/2019 | ............ B60W 30/16 |
| JP | 2019-172113 A | 10/2019 | |

OTHER PUBLICATIONS

Mei—English Translation—JP2019131077A (Year: 2019).*
Notice of Reasons for Refusal received in Japanese Patent Application No. 2020-074085, dated Dec. 5, 2023.

* cited by examiner

*Primary Examiner* — Scott A Reinbold
(74) *Attorney, Agent, or Firm* — Rimon P.C.; Tomoki Tanida

(57) ABSTRACT

A driving support device for a vehicle includes a separation line recognizer configured to recognize pairs of right and left separation lines ahead of the vehicle on vehicle's traveling roads, a target route setting unit configured to set a target route along center lines of lanes defined with respective centers of each of the pairs of the separation lines, a steering controller configured to perform steering control for driving the vehicle along the target route, and a target route corrector configured to correct the target route when an intersecting road is on the target route and an angle between a center line of the vehicle's current traveling road before the intersecting road and a center line on the intersecting road is a set angle or less, set a route correction section, calculate a arc tangent to the two center lines, and correct the target route based on the calculated arc.

7 Claims, 10 Drawing Sheets

DRIVING SUPPORT DEVICE FOR VEHICLE

CROSS-REFERENCE TO RELATED APPLICATIONS

The present application claims priority from Japanese Patent Application No. 2020-074085 filed on Apr. 17, 2020, the entire contents of which are hereby incorporated by reference.

BACKGROUND

The disclosure relates to a driving support device for a vehicle, which helps the vehicle travel along a target route set on a traveling road for the vehicle.

In recent years, driving support devices for supporting drivers in driving vehicles such as automobiles have been put into practical use to reduce the load on the drivers during the driving operation and improve safety. Various techniques for such a driving support device have been developed regarding a driving support mode for implementing steering support control or acceleration or deceleration control on the premise that the driver performs an autonomous driving operation or a driving support mode (so-called automatic driving mode) for driving a vehicle without the driving operation of the driver (see, for example, Japanese Unexamined Patent Application Publication No. 2019-172113).

Such a driving support device has an adaptive cruise control (ACC) function, an active lane keeping control (ALKC) function for keeping a vehicle centered in a lane, and any other suitable function to automatically drive the vehicle along the travel lane while keeping a safe distance from a vehicle just ahead. The driving support device also has a locator function to automatically navigate the vehicle to the desired destination.

In the ALKC, the driving support device recognizes lane lines or left and right separation lines of the lane in which the vehicle is traveling by using a forward recognition device such as a stereo camera mounted in the vehicle or by using accurate road map information stored in an accurate road map database. In the ALKC, furthermore, a target route is set along the center of a lane defined by the left and right separation lines, and steering control is performed to drive the vehicle along the set target route.

SUMMARY

An aspect of the disclosure provides a driving support device for a vehicle. The device includes a lane separation line recognizer, a target route setting unit, a steering controller, and a target route corrector. The lane separation line recognizer is configured to recognize pairs of right and left lane separation line ahead of the vehicle on traveling roads on which the vehicle is to travel. The target route setting unit is configured to set a target route along center lines of lanes on the traveling roads. Each of the center lines are defined with respective centers of each of the pairs of the right and left lane separation lines. The traveling roads include a current traveling road on which the vehicle travels. The steering controller is configured to perform steering control for driving the vehicle along the target route. The target route corrector is configured to correct the target route when an intersecting road intersecting the current traveling road is present on the target route and an angle between a first center line and a second center line is less than or equal to a set angle. The first center line is a center line of the lane on the current traveling road before the intersecting road. The second center line is a center line of the intersecting road. The target route corrector sets a route correction section in the current traveling road before the intersecting road. When the vehicle reaches each of two or more correction positions in the route correction section, the target route corrector calculates a tangent arc tangent to the first center line and the second center line, and corrects the target route on a basis of the calculated tangent arc.

An aspect of the disclosure provides a driving support device for a vehicle. The device includes circuitry. The circuitry is configured to recognize pairs of right and left lane separation line ahead of the vehicle on traveling roads on which the vehicle is to travel. The circuitry is configured to set a target route along center lines of lanes on the traveling roads. Each of center lines are defined with respective centers of each of the pairs of the right and left lane separation lines. The traveling roads include a current traveling road on which the vehicle travels. The circuitry is configured to perform steering control for driving the vehicle along the target route. The circuitry is configured to correct the target route when an intersecting road intersecting the current traveling road is present on the target route and an angle between a first center line and a second center line is less than or equal to a set angle. The first center line is a center line of the lane on the current traveling road before the intersecting road. The second center line is a center line of the intersecting road. The circuitry is configured to set a route correction section in the current traveling road before the intersecting road. When the vehicle reaches each of two or more correction positions in the route correction section, the circuitry is configured to calculate a tangent arc tangent to the first center line and the second center line, and correct the target route on a basis of the calculated tangent arc.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

There may be an intersecting road ahead on a traveling road on which a vehicle travels, such as a merging area of an expressway where an on-ramp merges with a main lane, or a T-junction or an intersection at which the vehicle turns right or left. In this case, if a target route for active lane keeping control (ALKC) for keeping a vehicle centered in a lane is set by directly using the lane center on the traveling road for the vehicle and the lane center on the intersecting road, the vehicle is controlled to turn sharply when entering the intersecting road after traveling in a straight line.

A mere approximation of a bend in the target route by one simple circular arc may make it difficult for the vehicle to make a smooth turn at and pass through the bend in the target route, in particular, when the vehicle is traveling at a relatively high speed.

It is therefore desirable to provide a driving support device for a vehicle, which enables the vehicle to make a smooth turn at a bend in a target route.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
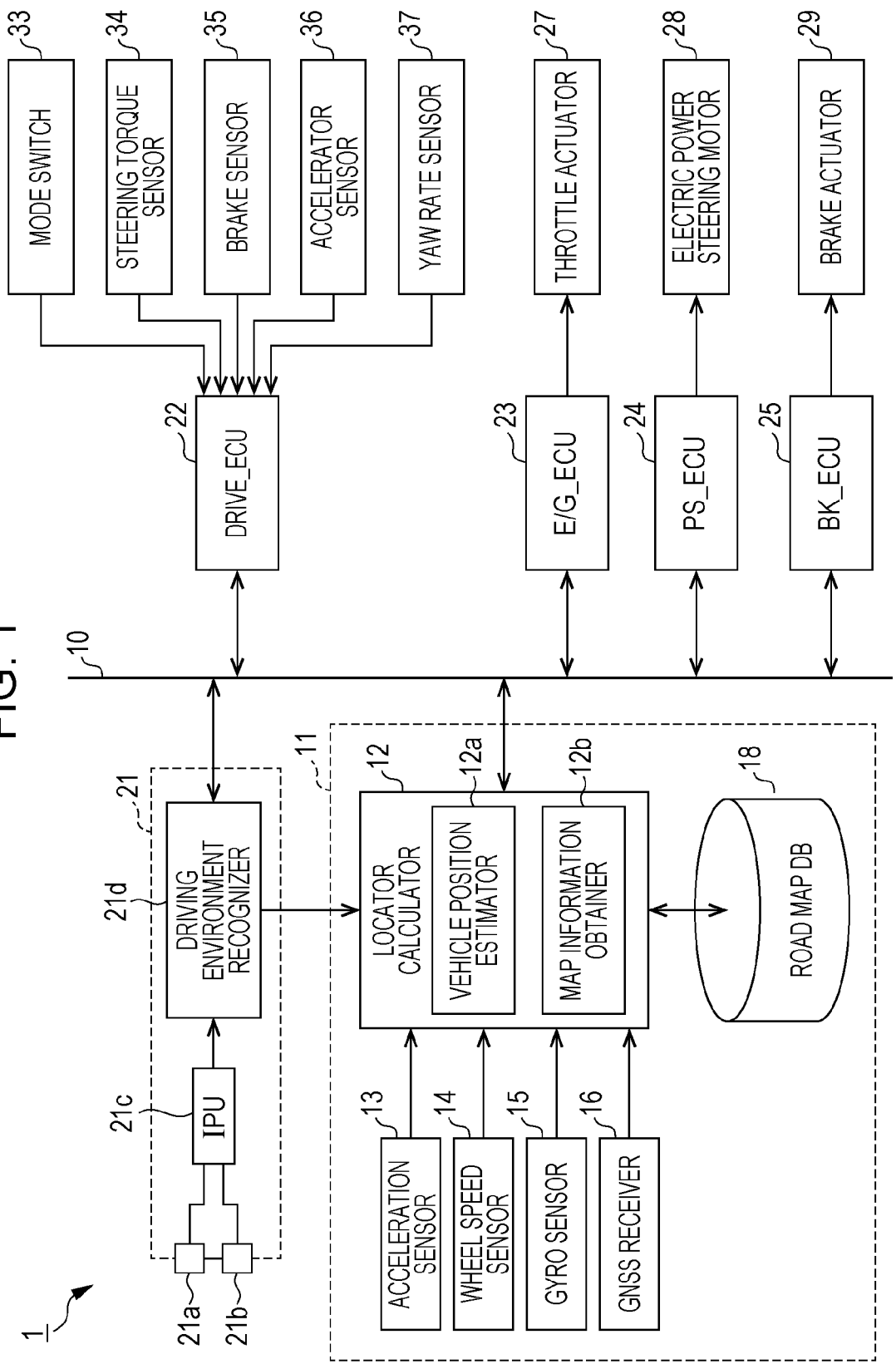
FIG. 1 is a schematic configuration diagram illustrating a driving support device for a vehicle.

A driving support device 1 illustrated in FIG. 1 is mounted in a vehicle 100 such as an automobile. The driving support device 1 includes a locator unit 11 and a camera unit as sensor units for recognizing a driving environment outside the vehicle 100, and the units 11 and 21 form a completely independent multiplex system in which the units 11 and 21 are not dependent on each other. The driving support device 1 further includes a drive control unit (hereinafter referred to as "drive_ECU") 22, an engine control unit (hereinafter referred to as "E/G_ECU") 23, a power steering control unit (hereinafter referred to as "PS_ECU") 24, and a brake control unit (hereinafter referred to as "BK_ECU") 25, and the control units 22 to 25, the locator unit 11, and the camera unit 21 are coupled to one another via an in-vehicle communication line 10 such as a controller area network (CAN).

The locator unit 11 estimates the position of the vehicle 100 on the road map. The locator unit 11 includes a locator calculator 12 that estimates the position of the vehicle 100. Sensors to be used to estimate the position of the vehicle 100 (hereinafter referred to sometimes as the vehicle position) are coupled to the input side of the locator calculator 12. The sensors include a front and rear acceleration sensor 13 that detects the front and rear acceleration of the vehicle 100, a wheel speed sensor 14 that detects the rotational speed of the front, rear, left, and right wheels, a gyro sensor 15 that detects the angular speed or angular acceleration of the vehicle 100, and a global navigation satellite system (GNSS) receiver 16 that receives positioning signals transmitted from a plurality of positioning satellites.

The locator calculator 12 is coupled to an accurate road map database 18. The accurate road map database 18 is a large-capacity storage medium such as a hard disk drive (HDD) and stores accurate road map information (dynamic map). The accurate road map information includes lane data to be used for automatic driving, such as a road type (e.g., highway, mountain road, expressway, etc.), lane width data, lane center position coordinate data, lane travel azimuth data, and speed limit. The lane data is stored for each lane on the road map at intervals of several meters.

The locator calculator 12 includes a vehicle position estimator 12a that estimates the position of the vehicle 100, and a map information obtainer 12b. The map information obtainer 12b obtains, for example, based on a destination set by the driver for automatic driving, route map information from the current location to the destination from the map information stored in the accurate road map database 18.

The map information obtainer 12b transmits the obtained route map information (lane data on the route map) to the vehicle position estimator 12a. The vehicle position estimator 12a obtains the position coordinates of the vehicle 100 on the basis of the positioning signals received by the GNSS receiver 16. Further, the vehicle position estimator 12a performs map matching of the obtained position coordinates onto the route map information to estimate the position of the vehicle 100 on the road map. In addition, the vehicle position estimator 12a recognizes the left and right lane separation lines of the traveling road (travel lane) for the vehicle 100, and obtains the road curvature of the travel lane center, which is stored in the road map data. In one embodiment, the vehicle position estimator 12a may serve as a "lane separation line recognizer".

In an environment where it is difficult to receive effective positioning signals from positioning satellites due to the reduced sensitivity of the GNSS receiver 16, such as when the vehicle 100 is traveling in a tunnel, the vehicle position estimator 12a switches to autonomous navigation for estimating the position of the vehicle 100 using the vehicle speed determined based on the wheel speed detected by the wheel speed sensor 14, the angular speed detected by the gyro sensor 15, and the front and rear acceleration detected by the front and rear acceleration sensor 13, and estimates the position of the vehicle 100 on the road map.

Upon estimating the position of the vehicle 100 on the road map on the basis of the positioning signals received by the GNSS receiver 16 or the information and the like detected by the gyro sensor 15 and the like in the way described above, the vehicle position estimator 12a determines the road type or the like of the traveling road on which the vehicle 100 is traveling on the basis of the estimated position of the vehicle 100 on the road map.

The camera unit 21 includes an on-board camera (stereo camera) including a main camera 21a and a sub-camera 21b, which are fixed in the upper center of the front portion of the passenger compartment of the vehicle 100 in such a manner as to be positioned symmetrically across the center in the vehicle width direction. The camera unit 21 further includes an image processing unit (IPU) 21c and a driving environment recognizer 21d.

The IPU 21c performs predetermined image processing of forward driving environment image information of images of the driving environment ahead of the vehicle 100, which are captured by the cameras 21a and 21b, and generates forward driving environment image information (distance image information) including distance information determined from the amount of displacement of the position of the corresponding target.

The driving environment recognizer 21*d* determines, based on the distance image information and the like received from the IPU 21*c*, the road curvature (in 1/m) of left and right separation lines of a lane on the forward traveling road on which the vehicle 100 travels (forward traveling road for the vehicle 100), and the width between the left and right separation lines (lane width). There are various known methods for determining the road curvature and the lane width. For example, the driving environment recognizer 21*d* performs binarization processing on the road curvature using a luminance difference on the basis of the forward driving environment image information to recognize the left and right separation lines, and determines the curvature of the left and right separation lines for each predetermined section in accordance with a curve approximate expression or the like by the least squares method. In one embodiment, the driving environment recognizer 21*d* may serve as a "lane separation line recognizer".

The driving environment recognizer 21*d* determines the road curvature of the lane center on the basis of the curvature of the left and right separation lines and the lane width, and further calculates the lateral position deviation of the vehicle 100 from the lane center, or more precisely, a vehicle lateral position deviation xi, which is the distance from the lane center to the center of the vehicle 100 in the vehicle width direction.

Further, the driving environment recognizer 21*d* performs predetermined pattern matching and the like on the distance image information and recognizes guardrails, curbs, and three-dimensional objects present along the road. In the recognition of a three-dimensional object, the driving environment recognizer 21*d* recognizes, for example, the type of the three-dimensional object, the distance to the three-dimensional object, the speed of the three-dimensional object, the relative speed between the three-dimensional object and the vehicle 100, and so on.

The position of the vehicle 100, which is estimated by the vehicle position estimator 12*a* of the locator calculator 12, the vehicle lateral position deviation xi and three-dimensional object information determined by the driving environment recognizer 21*d* of the camera unit 21, and so on are read by the drive_ECU 22. Various switches and sensors are coupled to the input side of the drive_ECU 22. The switches and sensors include a mode switch 33 operated by the driver to switch between turning on and off automatic driving (driving support control), a steering torque sensor 34 that detects the steering torque, which is an amount of driving operation performed by the driver, a brake sensor 35 that detects the amount of depression of the brake pedal as an amount of driving operation performed by the driver, an accelerator sensor 36 that detects the amount of depression of the accelerator pedal as an amount of driving operation performed by the driver, and a yaw rate sensor 37 that detects the yaw rate acting on the vehicle 100.

The drive_ECU 22 has driving modes including a manual driving mode, a first driving support mode, a second driving support mode, and an evacuation mode. The first driving support mode and the second driving support mode are modes for driving support control.

The manual driving mode is a driving mode based on steering maneuvers of the driver, and is a driving mode for driving the vehicle 100 in accordance with the driving operations of the driver, such as the steering operation, the accelerator operation, and the brake operation.

The first driving support mode is also a driving mode based on steering maneuvers of the driver. In one example, the first driving support mode is a so-called semi-automatic driving mode for driving the vehicle 100 along the target travel route while reflecting the driving operations of the driver by, for example, controlling the E/G_ECU 23, the PS_ECU 24, the BK_ECU 25, and the like to mainly combine adaptive cruise control (ACC), active lane keeping control (ALKC) for keeping a vehicle centered in a lane, and lane deviation prevention control for preventing a vehicle from departing a lane, as necessary.

The second driving support mode is an automatic driving mode for driving the vehicle 100 along the target travel route without the driver performing steering maneuvers, accelerator operations, or brake operations by, for example, controlling the E/G_ECU 23, the PS_ECU 24, the BK_ECU 25, and the like to mainly combine the ACC, the ALKC, and the lane deviation prevention control, as necessary.

The evacuation mode is a mode for, for example, automatically bringing the vehicle 100 to a complete stop at the roadside lane or the like when, during traveling in the second driving support mode, the vehicle 100 is disabled and no longer continues to travel in the same mode and the driver fails to take over the driving operation (i.e., when the transition to the manual driving mode or the first driving support mode is unsuccessful).

The driving modes set in the way described above are selectively switchable by the drive_ECU 22 in accordance with the operation state or the like of the mode switch 33.

A throttle actuator 27 is coupled to the output side of the E/G_ECU 23. The throttle actuator 27 opens or closes a throttle valve of an electronically-controlled throttle disposed in a throttle body of an engine. In response to a drive signal from the E/G_ECU 23, the throttle actuator 27 opens or closes the throttle valve to adjust the flow rate of the intake air to generate the desired engine output.

An electric power steering motor 28 is coupled to the output side of the PS_ECU 24. The electric power steering motor 28 applies a steering torque to a steering mechanism by using the rotational force of the motor 28. In automatic driving, in response to a drive signal from the PS_ECU 24, the electric power steering motor 28 is controlled to operate to perform the active lane keeping control to keep the vehicle 100 traveling in the current travel lane, and lane change control (lane change control for overtaking control or the like) to move the vehicle 100 to an adjacent lane.

A brake actuator 29 is coupled to the output side of the BK_ECU 25. The brake actuator 29 adjusts the brake hydraulic pressure to be supplied to brake wheel cylinders provided for the respective wheels. When the brake actuator 29 is driven by a drive signal from the BK_ECU 25, the brake wheel cylinders generate brake forces on the respective wheels, and the vehicle 100 is forced to decelerate.

In the driving support device 1, the drive_ECU 22 generally performs the following processing as the active lane keeping control performed in the driving support control described above (the first and second driving support modes).

Figure 2:
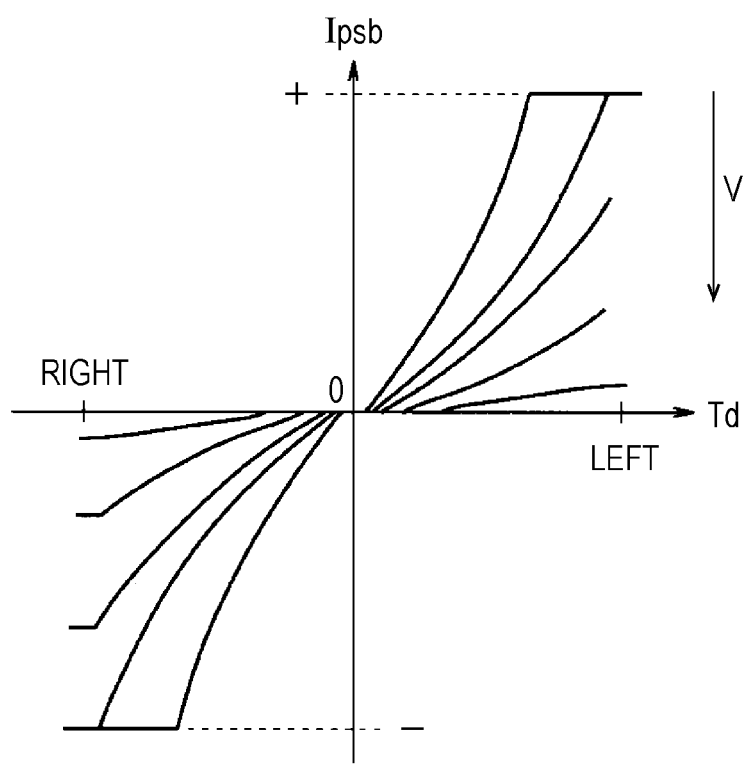
FIG. 2 is an explanatory diagram illustrating an example of the steering-torque to electric-motor-basic-current characteristic of an electric power steering motor.

In one example, the drive_ECU 22 first refers to the characteristic map (see FIG. 2) of a steering torque Td with respect to an electric motor basic current value Ipsb, which is set in advance, and sets the motor basic current according to the steering torque Td of the driver.

Figure 3:
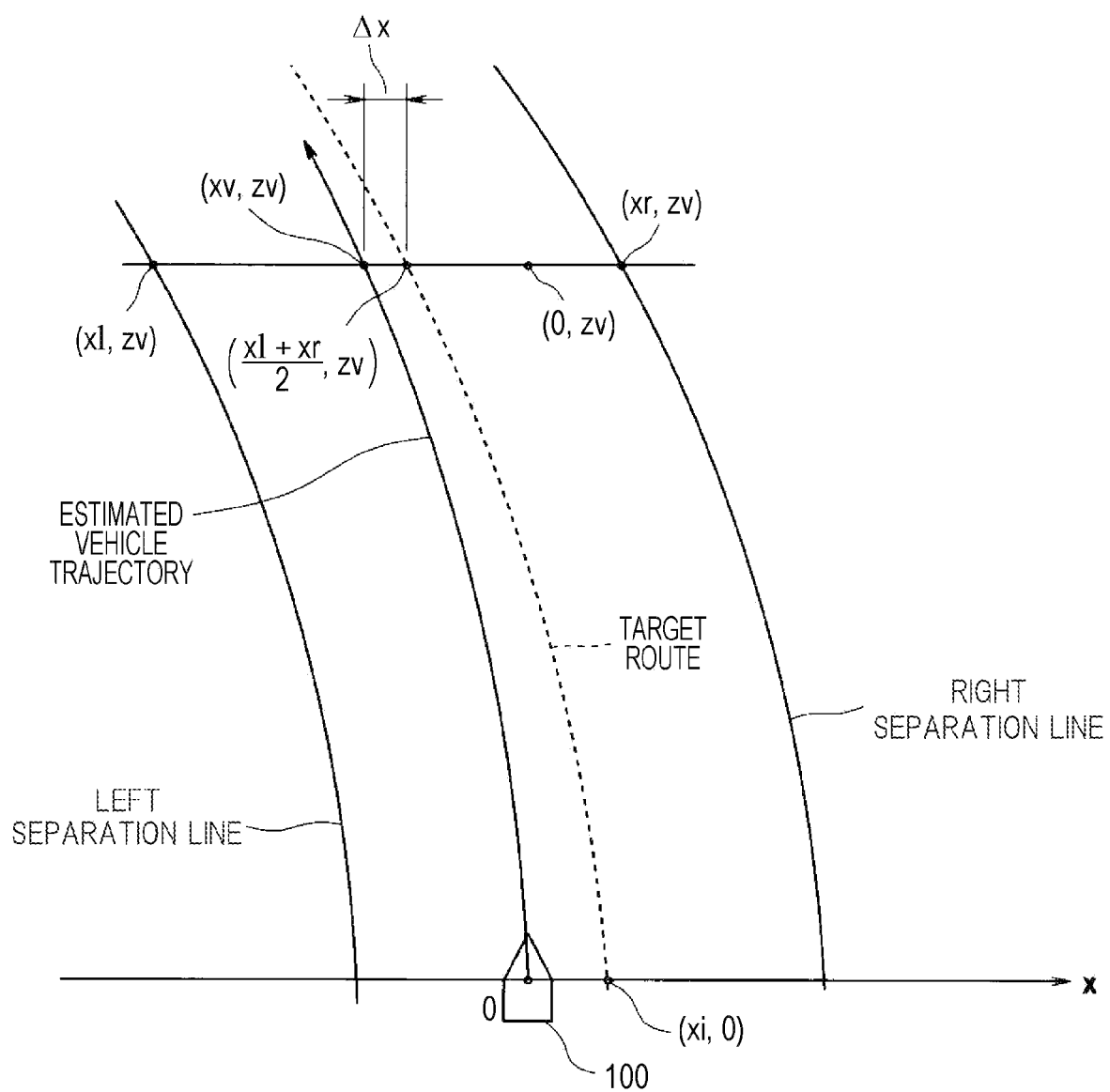
FIG. 3 is an explanatory diagram of feed-forward control in active lane keeping control.

Further, the drive_ECU 22 calculates the lane center (center line) of the travel lane for the vehicle 100 on the basis of at least one of the road map information from the locator unit 11 or the lane separation lines recognized by the camera unit 21, and sets a target route for driving the vehicle 100 along the center of the travel lane for the vehicle 100 (see FIG. 3).

Then, the drive_ECU 22 calculates a feed-forward current Iff for the electric power steering motor 28 as the value of current to be used to drive the vehicle 100 along the target route through feed-forward control on the basis of the shape of the traveling road in accordance with, for example, equation (1) below.

$$Iff = Giff \cdot \kappa \quad (1)$$

In equation (1), Giff denotes the feed-forward gain, which is set in advance by experiment, calculation, or the like. Further, κ denotes the curvature component of the target route.

Further, the drive_ECU 22 calculates the amount of displacement Δx (see FIG. 3) in position between the coordinates of a forward gaze point on the traveling trajectory of the vehicle 100, which is estimated on the basis of the current steering angle and the like, and the coordinates of the corresponding point on the target route and calculates a feedback current Ifb for the electric power steering motor 28 in accordance with, for example, equation (2) below.

$$Ifb = Gifb \cdot \Delta x \quad (2)$$

The forward gaze point is set to be variable in accordance with the speed of the vehicle 100. In this embodiment, the point at which the vehicle 100 reaches if the vehicle 100 travels for a set time (e.g., 3 seconds) while maintaining the current vehicle speed and steering angle is set as the forward gaze point. Further, Gifb denotes the feedback gain, which is set in advance by experiment, calculation, or the like.

Then, the drive_ECU 22 calculates an electric motor current value Icmd for the electric power steering motor 28 in accordance with, for example, equation (3) below.

$$Icmd = Ipsb + Iff + Ifb \quad (3)$$

The electric motor current value Icmd calculated in the way described above is output to the PS_ECU 24, and the driving of the electric power steering motor 28 is controlled in accordance with the electric motor current value Icmd.

In one embodiment, the drive_ECU 22 may serve as a "target route setting unit" and a "steering controller".

As described above, the drive_ECU 22 basically sets a target route, which is used for the active lane keeping control, along a center line Lc of a lane defined by the left and right lane separation lines of the travel lane in which the vehicle 100 travels. If an intersecting road is present on the travel lane for the vehicle 100, the drive_ECU 22 calculates the center line (first center line Lc1) of the travel lane before the intersecting road and the center line (second center line Lc2) of the travel lane on the intersecting road, and sets a target route along the first center line Lc1 and the second center line Lc2 (see FIG. 5). If an angle θ between the first center line Lc1 and the second center line Lc2 is less than or equal to a set angle, the drive_ECU 22 corrects the target route a plurality of times by using a circular arc.

In one example, the drive_ECU 22 sets a route correction section in the traveling road before the intersecting road. When the vehicle 100 reaches each of correction positions set in at least two locations in the route correction section, the drive_ECU 22 calculates a tangent arc tangent to the first center line Lc1 and the second center line Lc2 and corrects the target route based on the calculated tangent arc (see FIGS. 7 to 10). In one embodiment, the drive_ECU 22 may serve as a "target route corrector".

Figure 4:
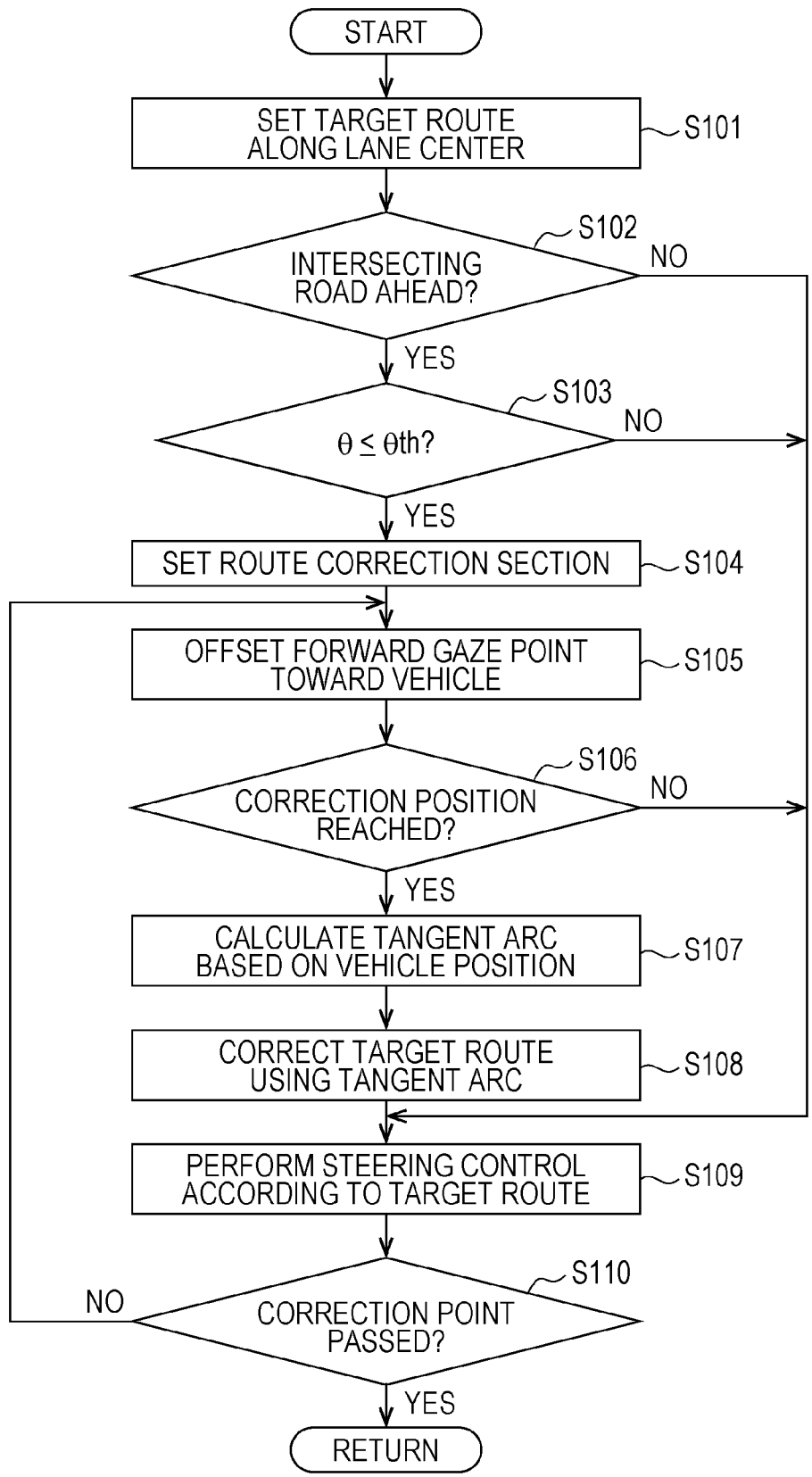
FIG. 4 is a flowchart illustrating an active lane keeping control routine.

Next, the active lane keeping control executed by the drive_ECU 22 will be described with reference to a flowchart of an active lane keeping control routine illustrated in FIG. 4. The routine is repeatedly performed every set time.

When the routine starts, in step S101, the drive_ECU 22 first sets a target route along the lane center. That is, the drive_ECU 22 calculates the center line Lc of the lane defined by the left and right separation lines of the current travel lane for the vehicle 100, and sets the calculated center line Lc as the target route. As described above, when an intersecting road is present on the traveling road for the vehicle 100 and the route to be traveled by the vehicle 100 is set along the intersecting road, the target route is also continuously set along the road on which the vehicle 100 is to travel on the intersecting road.

Then, in step S102, the drive_ECU 22 determines whether an intersecting road is present ahead on the traveling road for the vehicle 100 within a set distance.

If it is determined in step S102 that no intersecting road is present ahead on the traveling road for the vehicle 100 within the set distance, the drive_ECU 22 proceeds to step S109.

On the other hand, if it is determined in step S102 that an intersecting road is present ahead on the traveling road for the vehicle 100 within the set distance, the drive_ECU 22 proceeds to step S103.

When the drive_ECU 22 proceeds from step S102 to step S103, the drive_ECU 22 determines whether the angle θ between the center line before the intersecting road (the first center line Lc1) and the center line of the intersecting road (the second center line Lc2) is less than or equal to a set angle θth (e.g., θth=about 150°).

If it is determined in step S103 that the angle θ is greater than the set angle θth, the drive_ECU 22 proceeds to step S109.

Figure 5:
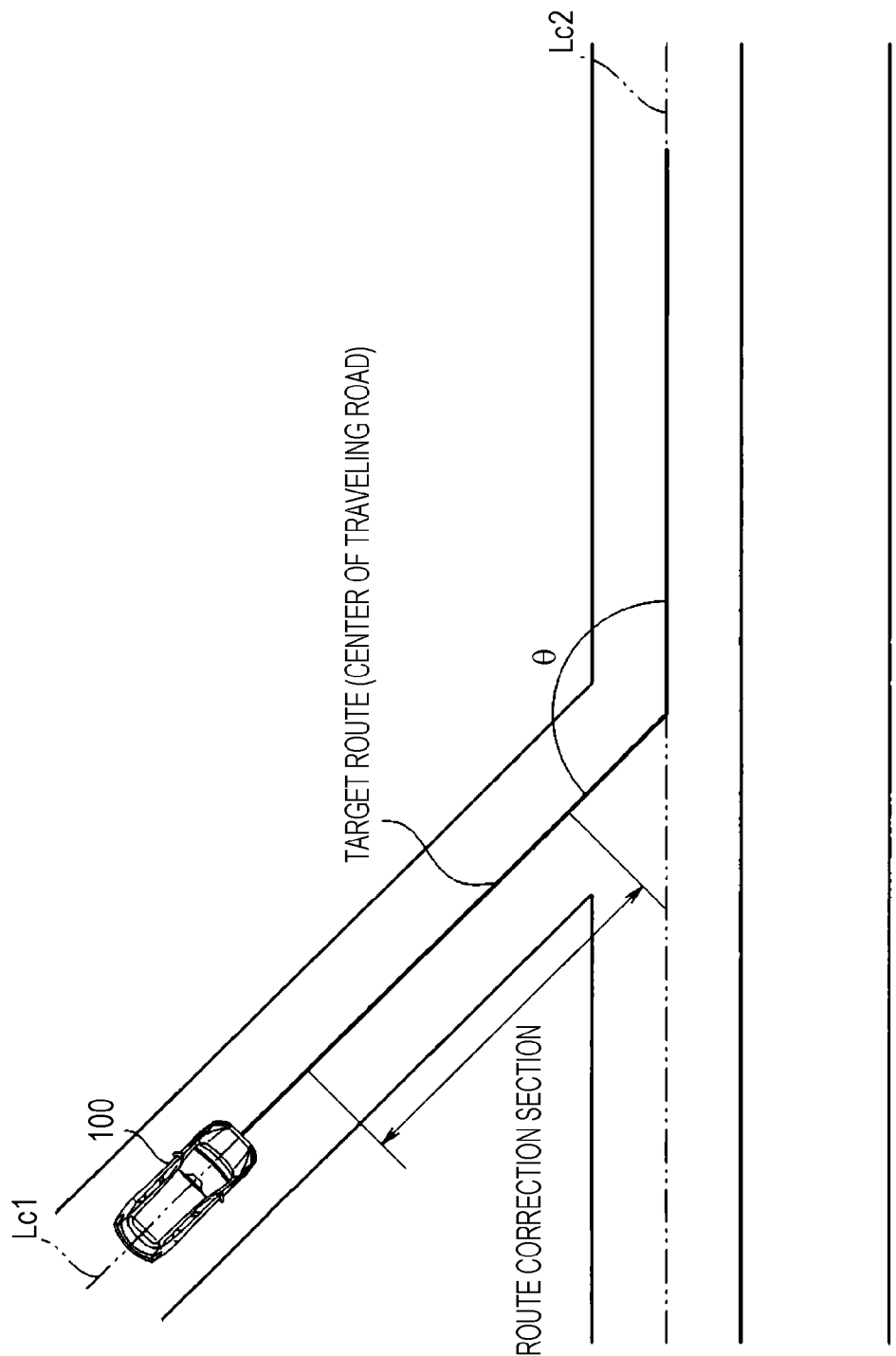
FIG. 5 is an explanatory diagram illustrating an example basic state of a target route when the vehicle enters a main line of an expressway through an on-ramp.

On the other hand, if it is determined in step S103 that the angle θ is less than or equal to the set angle θth, the drive_ECU 22 proceeds to step S104 and sets a route correction section in the traveling road for the vehicle 100 before the intersecting road (see FIG. 5).

The route correction section is a section in which calculation processing for route correction described below is permitted. In the route correction section, at least two points are set as points (correction positions) to be used for correcting the target route.

The length of the route correction section, the starting point and ending point of the route correction section (the distance from the intersection of the first center line Lc1 and the second center line Lc2), the number and position of correction positions, and so on may be fixed values or may be variable values depending on the angle θ, the width of the traveling road for the vehicle 100, the speed of the vehicle 100, the driving conditions of the vehicle 100, or the like.

Desirably, the ending point of the route correction section is set at a position away from the intersection of the first center line Lc1 and the second center line Lc2 by a set distance (e.g., 20 m) or longer. Further, desirably, the ending point of the route correction section is set at a position at which the tangent arc tangent to the first center line Lc1 and the second center line Lc2 has a radius R of 100 m or more when the tangent arc is calculated with respect to the ending point of the route correction section.

The correction position may not be a fixed position but may be set at each position at which, for example, the actual traveling trajectory of the vehicle 100 is away from the target route by a set distance (e.g., 1 m) in the vehicle width direction.

When the drive_ECU 22 proceeds from step S104 to step S105, the drive_ECU 22 offsets the forward gaze point for the feedback control in the active lane keeping control toward the vehicle 100. That is, the drive_ECU 22 reduces the time for calculating the forward gaze point from, for example, 3 seconds to about 1.6 seconds.

When the drive_ECU 22 proceeds from step S105 to step S106, the drive_ECU 22 determines whether the vehicle 100 has reached a correction position.

If it is determined in step S106 that the vehicle 100 has not reached a correction position, the drive_ECU 22 proceeds to step S109.

On the other hand, if it is determined in step S106 that the vehicle 100 has reached a correction position, the drive_ECU 22 proceeds to step S107 and calculates the tangent arc based on the position of the vehicle 100. That is, the drive_ECU 22 calculates a tangent arc tangent to the first center line Lc1 and the second center line Lc2 at the current position of the vehicle 100.

When the drive_ECU 22 process from step S107 to step S108, the drive_ECU 22 corrects the target route based on the tangent arc calculated in step S107.

Figure 6:
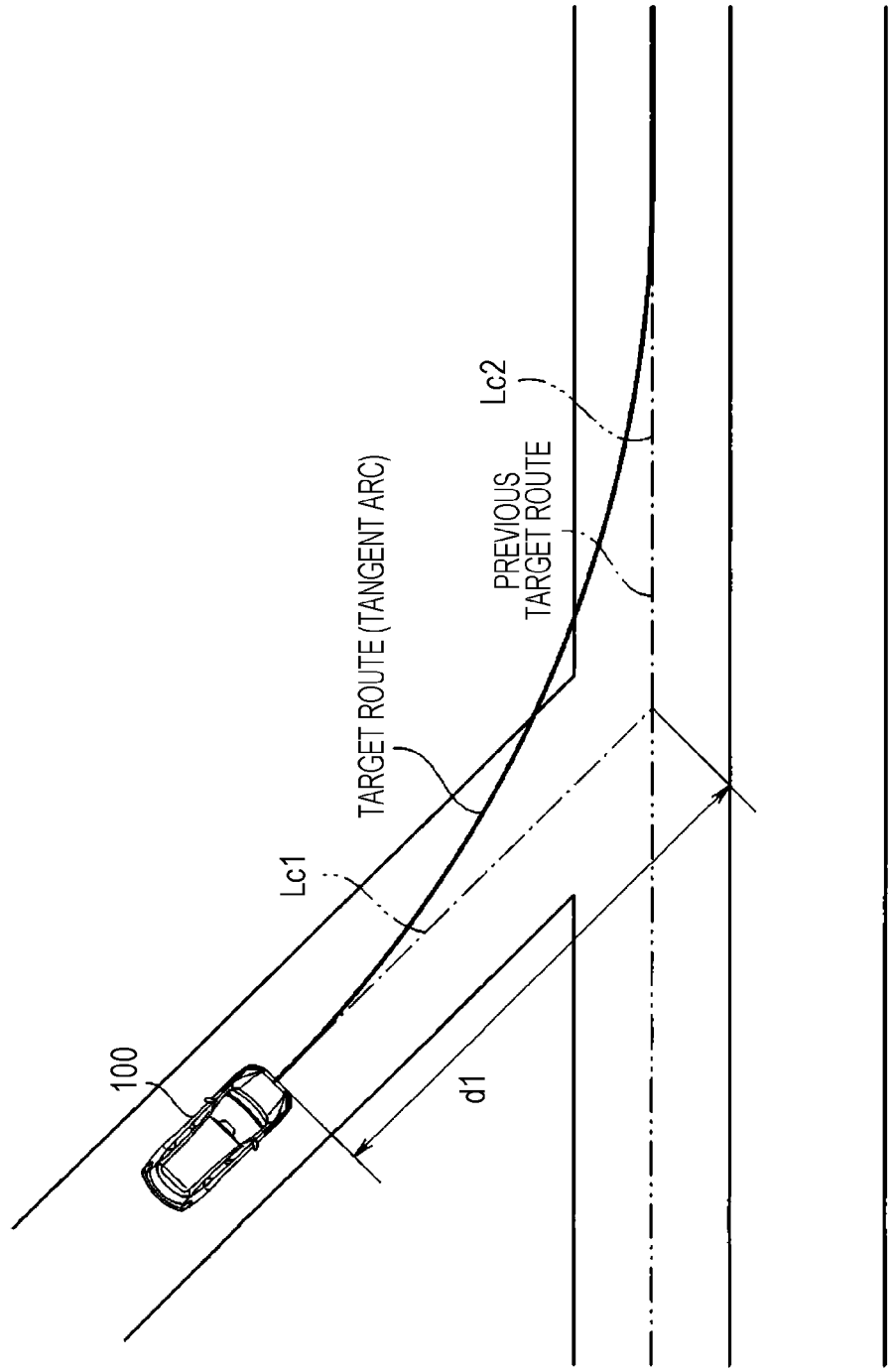
FIG. 6 is an explanatory diagram illustrating an example of a corrected target route when the vehicle enters the main line of the expressway through the on-ramp.

For example, as illustrated in FIG. 6, at the first correction position in the route correction section, the drive_ECU 22 corrects the target route by directly using the tangent arc calculated in step S107.

Figure 7:
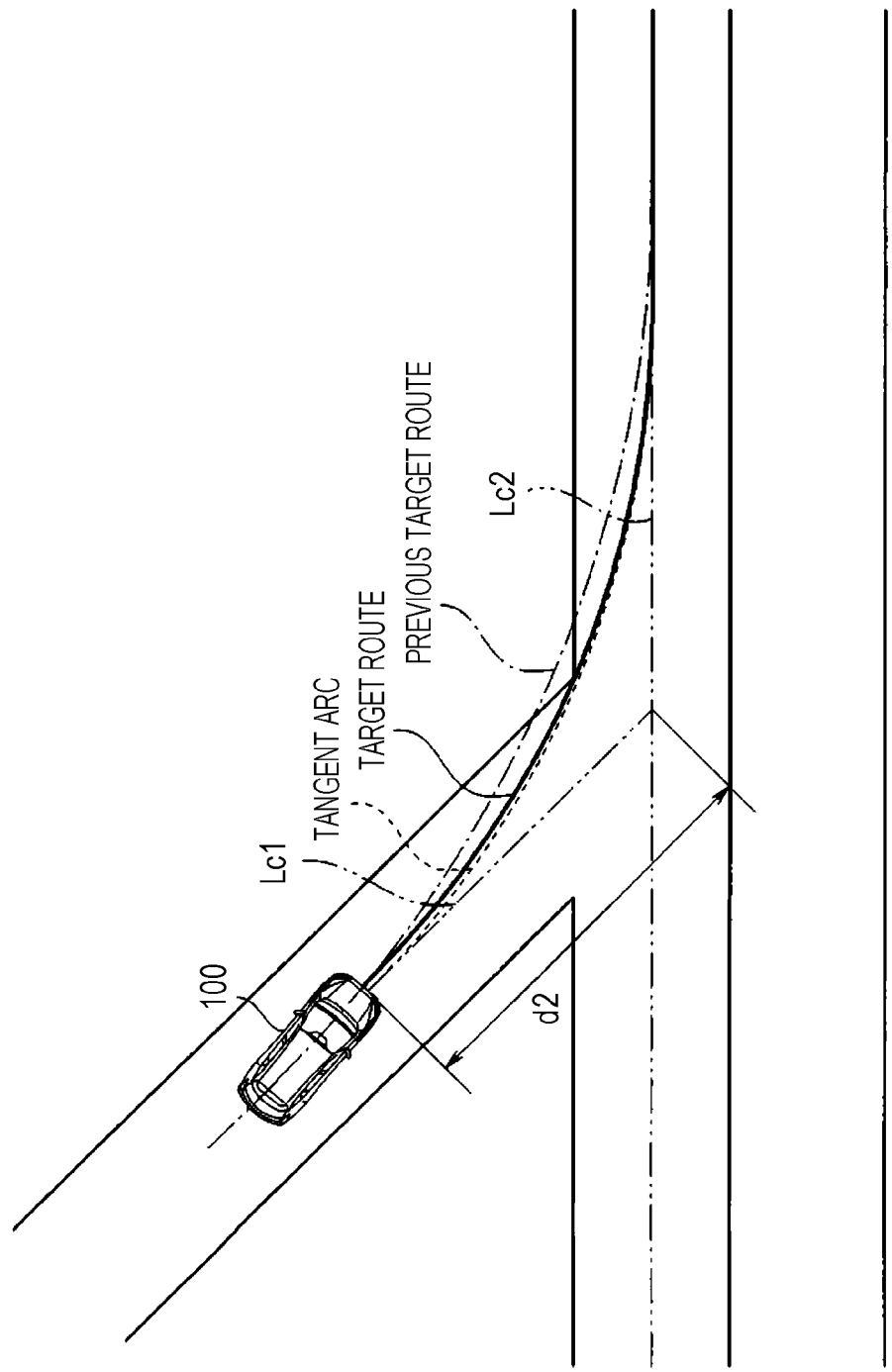
FIG. 7 is an explanatory diagram illustrating an example of a corrected target route when the vehicle enters the main line of the expressway through the on-ramp.
Figure 8:
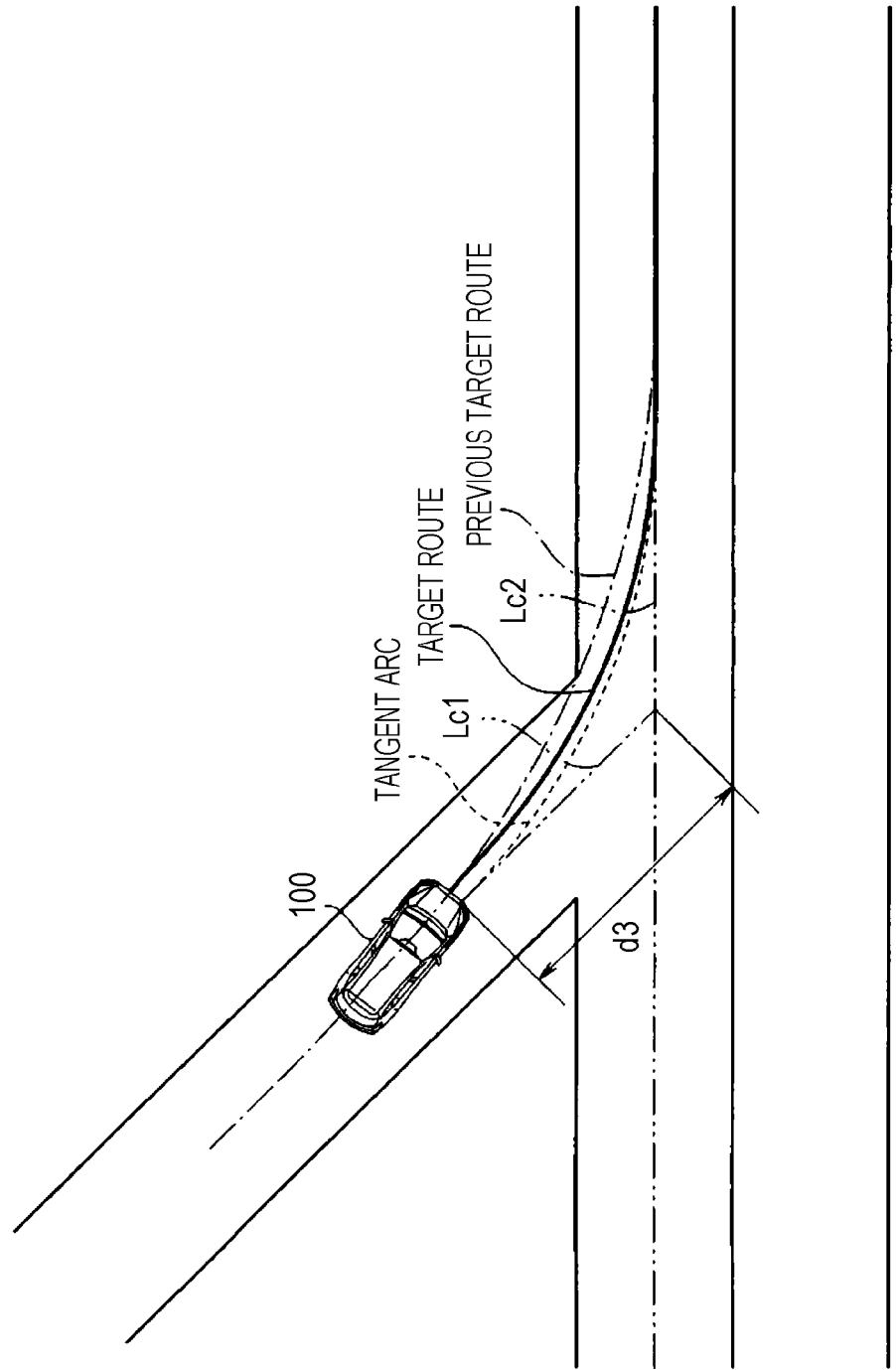
FIG. 8 is an explanatory diagram illustrating an example of a corrected target route when the vehicle enters the main line of the expressway through the on-ramp.
Figure 9:
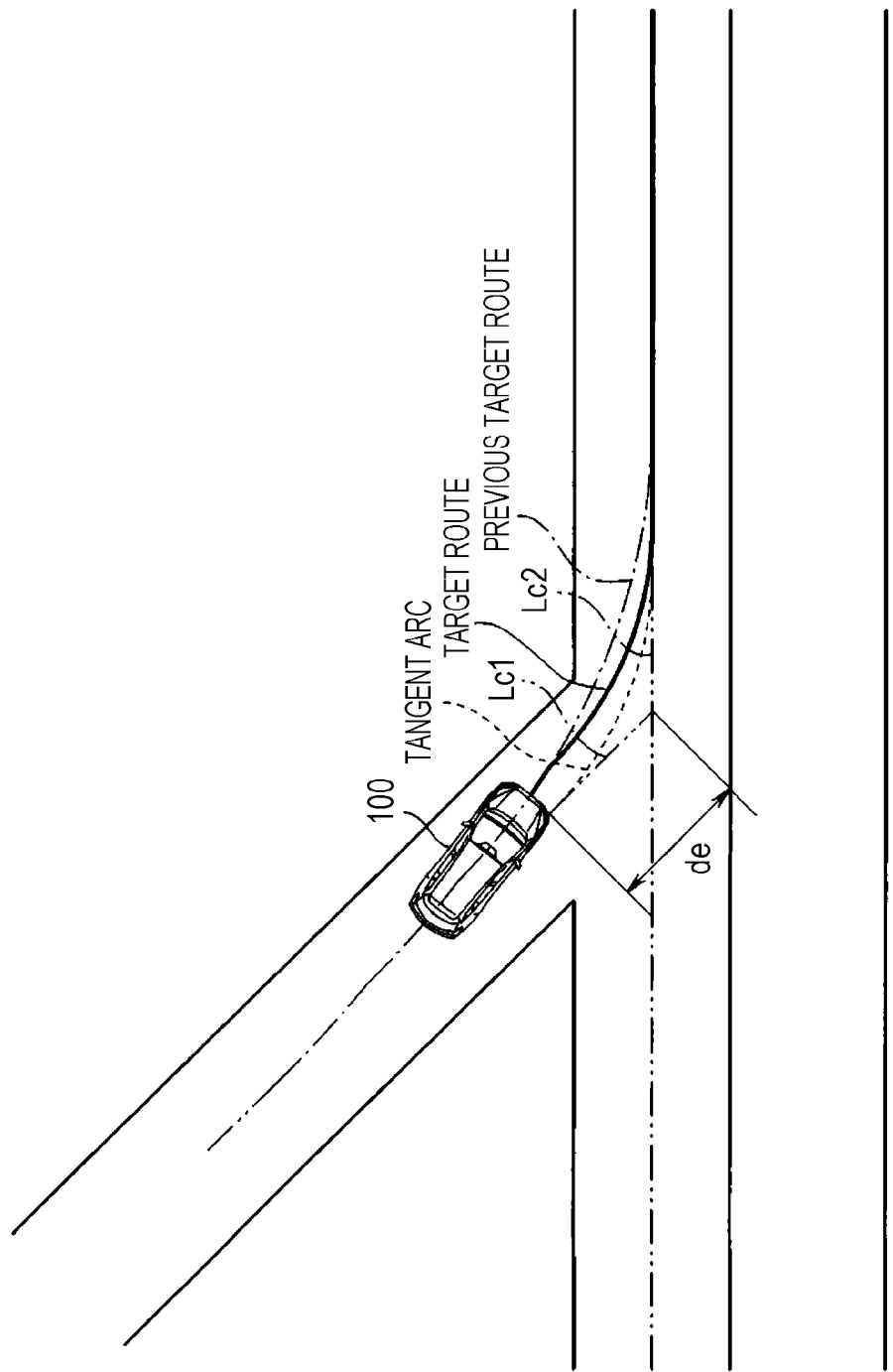
FIG. 9 is an explanatory diagram illustrating an example of a corrected target route when the vehicle enters the main line of the expressway through the on-ramp.
Figure 10:
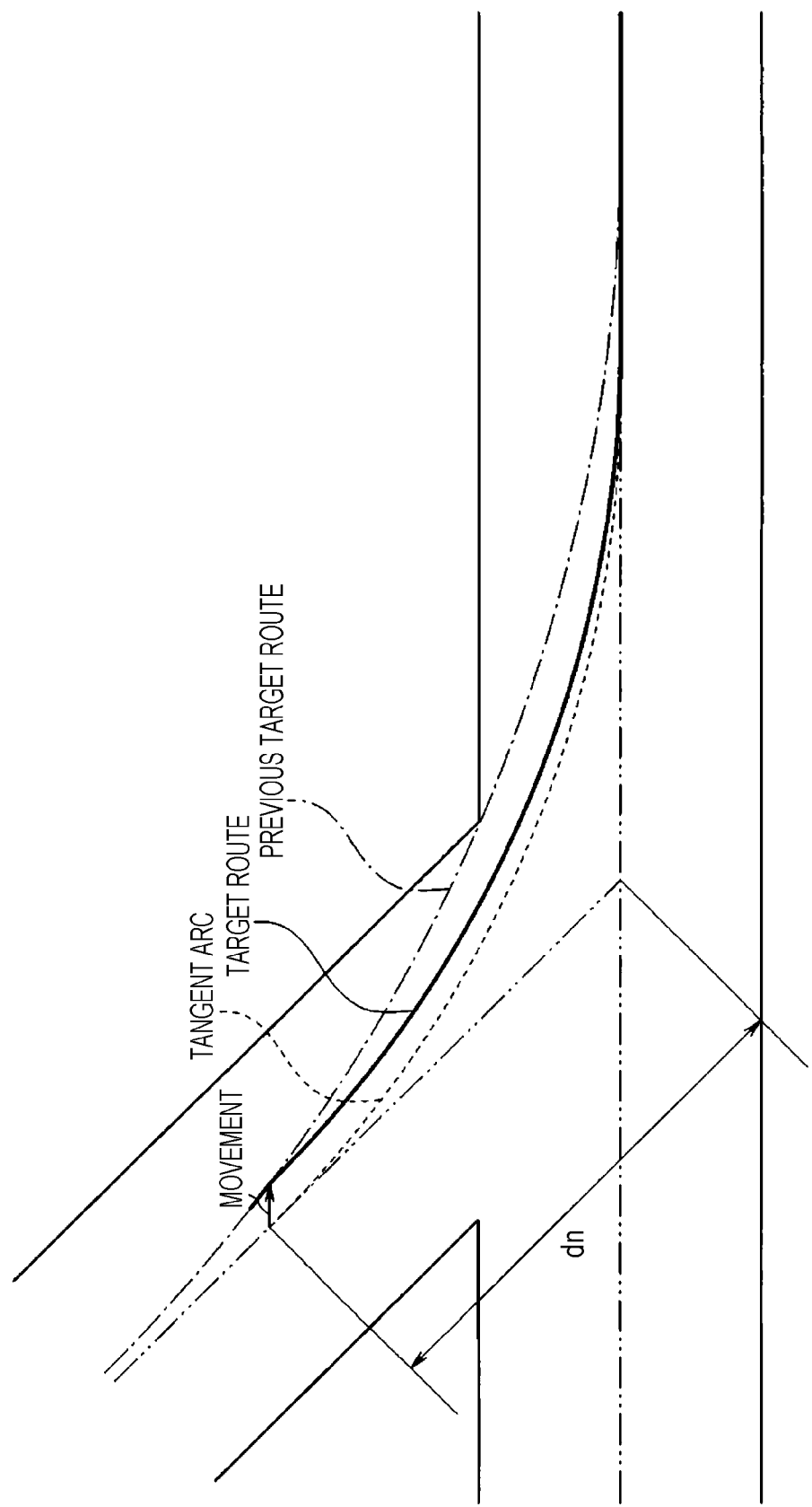
FIG. 10 is an explanatory diagram illustrating an example method for correcting the target route.

For example, as illustrated in FIG. 10, at the second and subsequent correction positions in the route correction section, the drive_ECU 22 corrects the target route by moving the tangent arc calculated in step S107 in parallel along the second center line Lc2 to a position at which the tangent arc is tangent to the previously corrected target route. Accordingly, for example, as illustrated in FIGS. 7 to 9, the previously corrected target route is corrected using the tangent arc at the current vehicle position. Consequently, a continuous target route can be obtained.

When the drive_ECU 22 proceeds from step S102, S103, S106, or S108 to step S109, the drive_ECU 22 performs steering control according to the currently set target route. That is, the drive_ECU 22 calculates the electric motor current value Icmd for the electric power steering motor 28 on the basis of the current target route in accordance with equation (3) given above, and performs drive control of the electric power steering motor 28 using the calculated electric motor current value Icmd.

When the drive_ECU 22 proceeds from step S109 to step S110, the drive_ECU 22 determines whether the vehicle 100 has passed a correction point on the target route (i.e., points corrected using the plurality of tangent arcs).

In step S110, if the vehicle 100 has not passed a correction point on the target route, the drive_ECU 22 returns to step S105. That is, if the vehicle 100 has not passed a correction point (arc-shaped section changed by correction), the drive_ECU 22 returns to step S105 to, while maintaining the current correction state for the target route, correct the target route based on, if the vehicle 100 has reached a new correction position, the tangent arc at the new correction position.

On the other hand, in step S110, if the vehicle 100 has passed a correction point on the target route, the drive_ECU 22 exits the routine.

According to this embodiment, when an intersecting road is present on a target route along the travel lane for the vehicle 100 and the angle θ between the first center line Lc1, which is the center line of the travel lane for the vehicle 100 before the intersecting road, and the second center line Lc2, which is the center line of the travel lane for the vehicle 100 on the intersecting road, is less than or equal to the set angle θth, the target route is corrected such that a route correction section is set in the travel lane for the vehicle 100 before the intersecting road and, when the vehicle 100 reaches each of two or more correction positions set in the route correction section, a tangent arc tangent to the first center line Lc1 and the second center line Lc2 is calculated and the target route is corrected based on the calculated tangent arc. This enables the vehicle 100 to make a smooth turn at a bend in the target route by using the active lane keeping control.

That is, the target route is corrected using at least two tangent arcs for each bend. This enables the vehicle 100 to turn the bend along a traveling trajectory approximated to a clothoid curve and pass the bend. As a result, smooth turning is implemented.

In this case, the drive_ECU 22 corrects the target route each time the vehicle 100 reaches a correction point, thereby reducing the computational load compared with the case where the target route is corrected using a plurality of tangent arcs at a time.

In addition, the ending point of the route correction section is set at a position away from the intersection of the first center line Lc1 and the second center line Lc2 by a preset distance or longer. This can prevent the radius of a tangent arc for correcting the target route from becoming excessively small and prevent the driver from sharply turning the steering wheel under the active lane keeping control.

Additionally, the position of the forward gaze point when the vehicle 100 travels at a corrected point on the target route is set to be closer to the vehicle 100 than the forward gaze point to be set when the vehicle 100 travels at any other point on the target route. This provides steering control sensitive to the road shape and can prevent the vehicle 100 from departing the lane when turning.

In the embodiment described above, the locator unit 11, the driving environment recognizer 21d of the camera unit 21, and the ECUs 22 to 25 are implemented by a know microcomputer including a central processing unit (CPU), a random access memory (RAM), a read-only memory (ROM), a non-volatile storage unit, and so on and peripherals thereof, and the ROM stores in advance programs to be executed by the CPU, fixed data such as data tables, and so on. All or some of the functions of a processor may be implemented by a logic circuit or an analog circuit, and processing of various programs may be implemented by an electronic circuit such as a field-programmable gate array (FPGA).

The disclosure is not limited to the embodiment described above, and the embodiment may be modified in various ways without departing from the spirit of the disclosure.

The locator unit 11, the driving environment recognizer 21d of the camera unit 21, and the ECUs 22 to 25 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the locator unit 11, the driving environment recognizer 21d of the camera unit 21, and the ECUs 22 to 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving support device for a vehicle, comprising:
   a lane separation line recognizer configured to recognize pairs of right and left lane separation lines ahead of the vehicle on traveling roads on which the vehicle is to travel;
   a target route setting unit configured to set a target route along center lines of lanes on the traveling roads, each of the center lines being defined with respective centers of each of the pairs of the right and left lane separation lines, the traveling roads including a current traveling road on which the vehicle travels;
   a steering controller configured to perform steering control for driving the vehicle along the target route; and
   a target route corrector configured to:
      determine that an intersecting road intersecting the current traveling road is present on the target route;
      in response to determining that the intersecting road is present, set the target route to be a first center line of the current traveling road and a second center line of the intersecting road that meets the first center line at a point of intersection, wherein the first center line and the second center line form an angle at a point of intersection;
      determine that the angle between the first center line and the second center line is less than or equal to a set angle;
      in response to determining that the angle is less than or equal to the set angle, set a route correction section in the current traveling road before the intersecting road, and set two or more correction positions within the route correction section;
      when the vehicle reaches first one of the two or more correction positions in the route correction section, calculate a first tangent arc tangent to the first center line and the second center line based on a first current position of the vehicle, and correct the target route based on the first tangent arc; and
      when the vehicle then reaches second one of the two or more correction positions in the route correction section, calculate a second tangent arc tangent to the first center line and the second center line based on a second current position of the vehicle, and correct the target route based on the second tangent arc.

2. The driving support device for a vehicle according to claim 1,
   wherein the steering controller is further configured to:
      estimate a traveling trajectory on which the vehicle is currently traveling;
      set a first forward gaze point on the estimated traveling trajectory, the first forward gaze point being set in front the vehicle;
      determine an amount of displacement between the first forward gaze point and a point corresponding to the first forward gaze point on the target route, and perform feedback control based on the amount of displacement so that the vehicle travels on the target route; and
   wherein the steering controller is further configured to:
      when the vehicle is traveling in the route correction section, set a second forward gaze point to a point closer to the vehicle than the first forward gaze point to be set when the vehicle is traveling sections other than the route correction section; and
      determine an amount of displacement between the second forward gaze point and a point corresponding to the second forward gaze point on the target route, and perform feedback control based on the amount of displacement so that the vehicle travels on the target route.

3. A driving support device for a vehicle, comprising circuitry configured to:
   recognize pairs of right and left lane separation lines ahead of the vehicle on traveling roads on which the vehicle is to travel;
   set a target route along center lines of lanes on the traveling roads, each of center lines being defined with respective centers of each of the pairs of the right and left lane separation lines, the traveling roads including a current traveling road on which the vehicle travels;
   perform steering control for driving the vehicle along the target route;
   determine that an intersecting road intersecting the current traveling road is present on the target route;
   in response to determining that the intersecting road is present, set the target route to be a first center line of the current traveling road and a second center line of the intersecting road that meets the first center line at a point of intersection, wherein the first center line and the second center line form an angle at a point of intersection;
   determine that the angle between the first center line and the second center line is less than or equal to a set angle;
   in response to determining that the angle is less than or equal to the set angle, set a route correction section in the current traveling road before the intersecting road, and set two or more correction positions within the route correction section; and
   when the vehicle reaches first one of the two or more correction positions in the route correction section, calculate a first tangent arc tangent to the first center line and the second center line based on a first current position of the vehicle, and correct the target route based on the first tangent arc; and
   when the vehicle then reaches second one of the two or more correction positions in the route correction section, calculate a second tangent arc tangent to the first center line and the second center line based on a second current position of the vehicle, and correct the target route based on the second tangent arc.

4. The driving support device for a vehicle according to claim 3,
   wherein the steering controller is further configured to:
      estimate a traveling trajectory on which the vehicle is currently traveling;
      set a first forward gaze point on the estimated traveling trajectory, the first forward gaze point being set in front the vehicle;
      determine an amount of displacement between the first forward gaze point and a point corresponding to the first forward gaze point on the target route, and perform feedback control based on the amount of displacement so that the vehicle travels on the target route; and
   wherein the steering controller is further configured to:
      when the vehicle is traveling in the route correction section, set a second forward gaze point to a point closer to the vehicle than the first forward gaze point to be set when the vehicle is traveling sections other than the route correction section; and determine an amount of displacement between the second forward gaze point and a point corresponding to the second forward gaze point on the target route, and perform feedback control based on the amount of displacement so that the vehicle travels on the target route.

5. A driving support device for a vehicle, comprising circuitry configured to:

recognize pairs of right and left lane separation lines ahead of the vehicle on traveling roads on which the vehicle is to travel;

set a target route along center lines of lanes on the traveling roads, each of center lines being defined with respective centers of each of the pairs of the right and left lane separation lines, the traveling roads including a current traveling road on which the vehicle travels;

perform steering control for driving the vehicle along the target route;

correct the target route when an intersecting road intersecting the current traveling road is present on the target route and an angle between a first center line and a second center line is less than or equal to a set angle, the first center line being a center line of the lane on the current traveling road before the intersecting road, the second center line being a center line of the intersecting road;

set a route correction section in the current traveling road before the intersecting road; and when the vehicle reaches each of two or more correction positions in the route correction section, calculate a tangent arc tangent to the first center line and the second center line, and correct the target route on a basis of the calculated tangent arc, wherein the circuitry is further configured to:

estimate a traveling trajectory on which the vehicle is currently traveling;

set a first forward gaze point on the estimated traveling trajectory, the first forward gaze point being set in front the vehicle;

determine an amount of displacement between the first forward gaze point and a point corresponding to the first forward gaze point on the target route, and perform feedback control based on the amount of displacement so that the vehicle travels on the target route; and wherein the circuitry is further configured to:

when the vehicle is traveling in the route correction section, set a second forward gaze point to a point closer to the vehicle than the first forward gaze point to be set when the vehicle is traveling sections other than the route correction section; and determine an amount of displacement between the second forward gaze point and a point corresponding to the second forward gaze point on the target route, and perform feedback control based on the amount of displacement so that the vehicle travels on the target route.

6. The driving support device for a vehicle according to claim 1, wherein the route correction section has an ending point set at a position away from an intersection of the first center line and the second center line by a preset distance or longer.

7. The driving support device for a vehicle according to claim 3, wherein the route correction section has an ending point set at a position away from an intersection of the first center line and the second center line by a preset distance or longer.

* * * * *